Figure 1A:
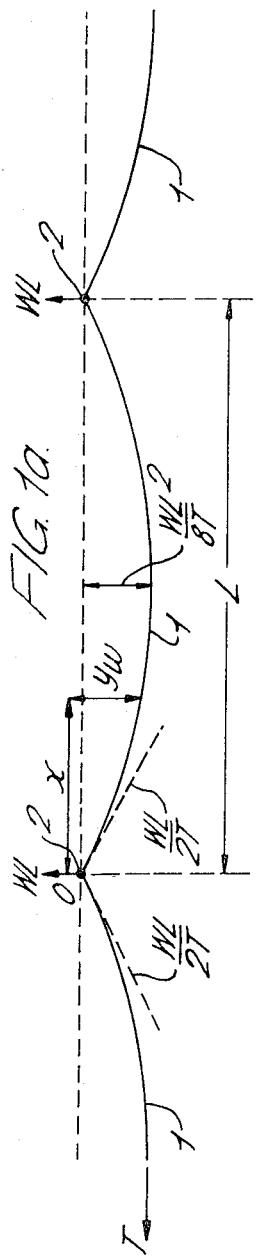

United States Patent
Tustin et al.

[15] 3,641,285
[45] Feb. 8, 1972

[54] TROLLEY WIRE OVERHEAD ELECTRIC SUPPLY SYSTEMS FOR ELECTRICALLY POWERED VEHICLES

[72] Inventors: Arnold Tustin, Tring; Richard Geoffrey Sell, Rugby, both of England

[73] Assignee: British Railways Board, London, England

[22] Filed: Nov. 10, 1969

[21] Appl. No.: 875,167

[30] Foreign Application Priority Data

Nov. 12, 1968 Great Britain.....................53,628/68

[52] U.S. Cl. ............................................................191/40
[51] Int. Cl. ..........................................................B60m 1/20
[58] Field of Search .................191/40, 41; 267/47, 158, 41; 248/54 R, 60; 174/40 R

[56] References Cited

FOREIGN PATENTS OR APPLICATIONS

| 918,317 | 2/1961 | Great Britain...........................191/41 |
| 647,699 | 10/1962 | Italy..........................................191/41 |
| 964,261 | 8/1950 | France....................................191/40 |

*Primary Examiner*—Arthur L. La Point
*Assistant Examiner*—George H. Libman
*Attorney*—Sommers & Young

[57] ABSTRACT

A trolley wire overhead electric supply system, for supplying power for the propulsion of electric vehicles, comprises a contact wire which is directly supported at each supporting mast through a spring. The spring is associated with an abutment so arranged that for an upward force below a predetermined value acting on the spring through the contact wire, the contact wire is relatively stiffly connected to the mast and, for an upward force above said predetermined value acting on said spring through said contact wire, the contact wire is relatively softly connected to said mast.

3 Claims, 6 Drawing Figures

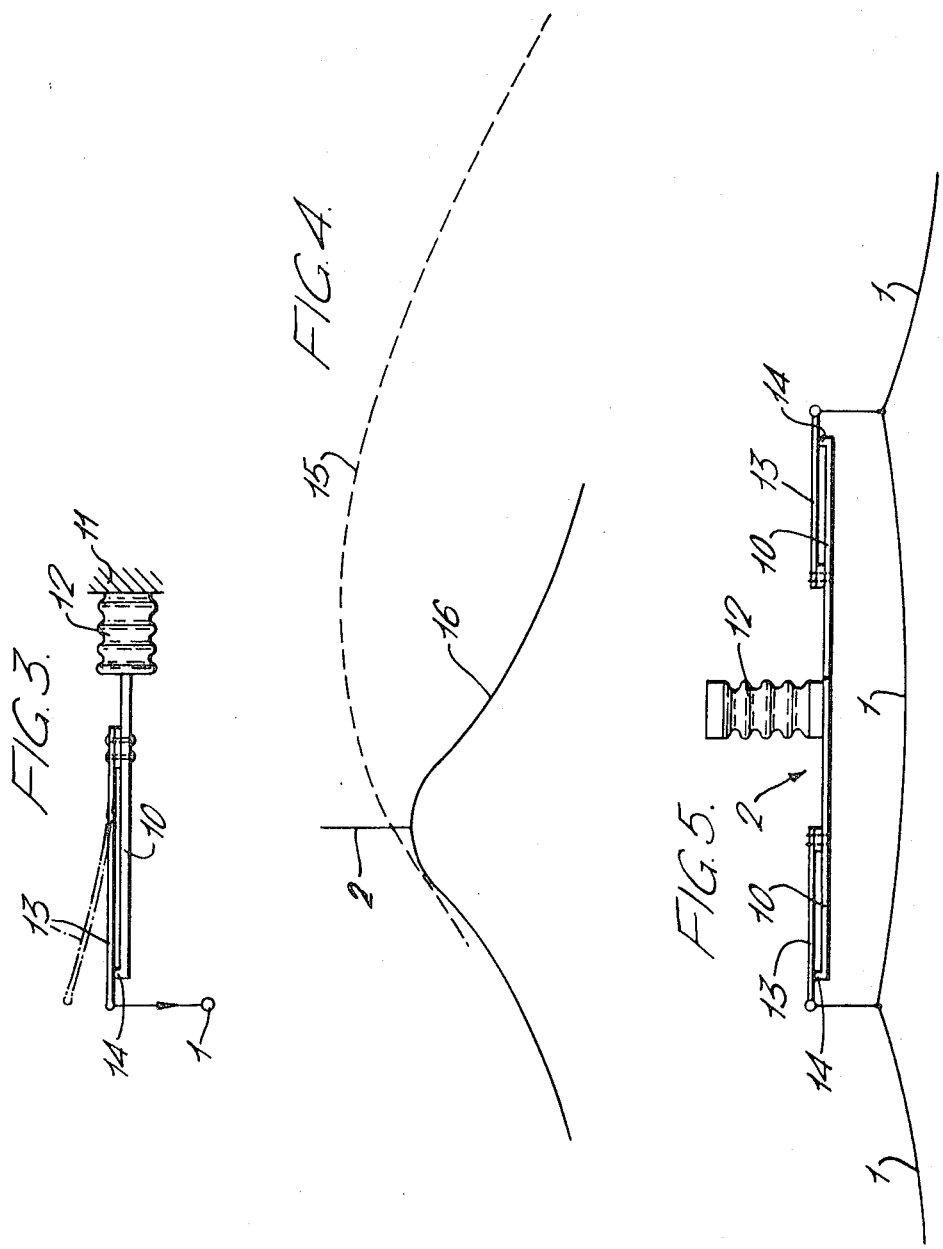

TROLLEY WIRE OVERHEAD ELECTRIC SUPPLY SYSTEMS FOR ELECTRICALLY POWERED VEHICLES

The invention relates to overhead electric supply systems in which electric current is drawn from an overhead contact wire to provide power for the propulsion of vehicles and particularly of rail vehicles having high maximum speeds.

It has hitherto been considered necessary where high speeds are required, to provide an overhead system of the kind commonly referred to as a catenary system, in which the contact wire is supported at intervals by 'droppers' from an auxiliary wire or 'catenary.' The purpose of this form of construction is to hold the contact wire approximately straight and parallel to the rails, or with a controlled amount of sag, so that the contact member on the vehicle (referred to as the 'pantograph') can maintain contact without being required to make large vertical movements, especially large vertical accelerations.

A simpler and less expensive system employs a single wire, supported only at or near supporting structure such as masts. This system is hereinafter referred to as a 'trolley wire system;' such systems have been extensively used for tramways, trolleybuses and for rail vehicles having low maximum speeds such as speeds less than 60 miles/hr.

The object of this invention is to design a trolley wire system so that with economical span lengths it can be used for vehicles travelling at much higher speeds, for example, vehicles travelling at speeds of 100 miles/hr. or at the still higher speeds that are likely to be required on railways in the future.

Figure 1B:
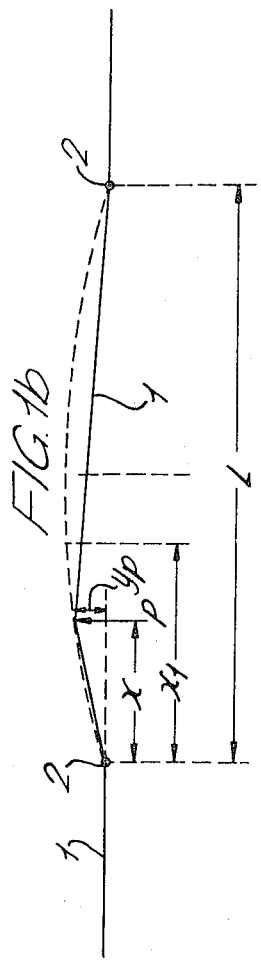
Figure 2:
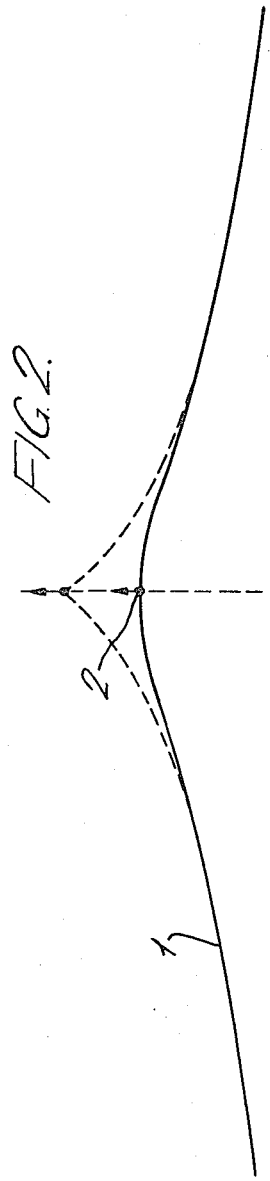

Reference will now be made to the accompanying diagrammatic drawings in which,

FIGS. 1a and 1b and FIG. 2 are explanatory diagrams of the characteristics of a trolley wire system, FIG. 3 shows one form of support for the contact wire of the trolley wire system, FIG. 4 is an explanatory diagram showing the effect of using the support of FIG. 3 and, FIG. 5 is a modified form of support to that shown in FIG. 3.

In order to explain the invention it is necessary first to describe the processes that occur when a pantograph traverses the single wire of the trolley wire system at high speeds, including the quantitative aspects of these processes and this will now be done with the aid of FIGS. 1a and 1b and FIGS. 2 of the accompanying drawings in which the single wire is referenced 1 and its support points at the masts are referenced 2.

Because the deflections of the wire due to forces are related to the forces by linear equations, the deflections due to any combination of forces may be obtained by addition of the deflections due to these forces separately. The principal forces in question are the weight of the wire and the force exerted on the wire by the pantograph. There are also forces corresponding with the inertia of the wire and its stiffness against bending and as the deflections due to these may be considered separately, it is convenient first to consider a wire supposed to have no stiffness or inertia.

The effect of the weight of the wire, in the case of a wire without stiffness, is to cause the profile of the wire to sag as shown in FIG. 1a. If the weight of the wire per unit length is $W$, the span length $L$ and the tension $T$, there is a reaction force $WL$ at each support, the slopes of the wire at each support are $+WL/-2T$ and the deflection at a distance $x$ from a support is:

$$y_w = \frac{W}{2T}(x-L)x$$

with a maximum of $WL^2/8T$ at midspan.

The deflection due to a pantograph traversing the span and exerting on the wire a constant contact force $P$ is now added. When $P$ is at a distance $x$ from a support, as shown in FIG. 1b, if the deflection at $x$ is $y_p$, the slopes of the wire to either side of $x$ are respectively $y_p/x$ and $y_p/L-x$ and equilibrium requires $$P = T\left(\frac{y_p}{x} + \frac{y_p}{L-x}\right)$$

So $$y_p = \frac{P}{TL} \cdot x \cdot (1-x) \qquad (1)$$

Adding this to the deflections due to the weight at $x$ gives the total deflection at $x$, that is the expression fro the trajectory of the contact point, for a flexible inertialess wire as $$y = y_w + y_p = -\left(\frac{W}{2T} - \frac{P}{TL}\right) \cdot x \cdot (L-x) \qquad (2)$$

The contact point trajectory therefore consists of a sequence of parabolic arcs and the change in slope of the trajectory as each support is passed is $$2\left(\frac{dy}{dx}\right)_0 = \Delta s = \frac{WL - 2P}{T} \qquad (3)$$

It is the magnitude of this change of slope of the trajectory of the contact point at or near each support that has generally been considered to make a single-wire line unsuitable for the higher speeds, since a pantograph head necessarily has inertia and the change of slope $\Delta_s$, at a vehicle speed V, would require a change in vertical velocity of the pantograph head of $V\Delta_s$, requiring an impulse of force on a head of mass $m$ of value $mV\Delta_s$. This would imply a very large increase in the contact pressure at or near each support.

This can be mitigated to some extent by reducing the change of slope $\Delta_s$ by using a combination of values of wire weight $W$, span $L$, tension $T$ and pantograph force $P$ such that $\Delta_s$ as given by eq. 3. is small. To achieve this the cross section of the wire and consequently the weight $W$ per unit length are made as small as possible, subject to considerations such as the current density under emergency loading conditions when the wire is fully worn and the allowable amount of wear and the tension $T$ is made as large as possible subject to a safe tensile stress not being exceeded on this cross section. It is envisaged that, as the wire wears, the tension will be progressively reduced to maintain approximately constant stress.

The change in slope may be greatly reduced in this way, as may be illustrated by the following numerical values.

If the single wire line has $W=0.64$ lb. per foot, $T=2,500$ lb. and $P=20$ lb., with a span length of 200 ft. the value of the change of slope $\Delta_s$ would be $$\Delta_s = \frac{0.64 \cdot 200 - 2.20}{2500} = 0.035.$$

If, however, a wire of half this cross section is used ($W=0.32$) made of cadmium-copper or silver-copper, the tension may safely be made 2,000 lb. and then $$\Delta_s = \frac{0.32 \cdot 200 - 2.20}{2000} = 0.012$$

Cadmium-copper and silver-copper which are less readily softened than pure copper by increase in temperature facilitate the use of smaller wire sizes. Other possible materials for the wire are tin-bronze, or cadmium-tin-bronze and fiber-reinforced materials.

The reduction in $\Delta_s$ would also be contributed to by increasing the pantograph force $p$, but this possibility is limited by considerations of wear.

Other considerations which have to be taken into account are the stiffness of the wire and its inertia. The effect of the inertia of the wire, is that if a thin wire is used, unless the tension $T$ is adequate, the oscillatory accelerations of the wire set up by the passage of the pantograph would be undesirably large. For this reason $T$ is made as large as the stress will safely allow to counteract this oscillation.

The effect of stiffness of the wire near a cusp is as shown in FIG. 2, where it causes a rounding of the cusps. It can be shown that the effect of stiffness in the wire in changing the slope of the wire is almost wholly confined to the immediate neighborhood of the cusps.

To summarize therefore, it is possible by a suitable relationship between the weight of the wire, the pantograph force and the tension in the wire to cause changes in slope of the trajectory of the pantograph head to be reasonably small. However it is not possible in practice to achieve the ideal and reduce this change in slope of the trajectory to zero. The specific aim of this invention is therefore to render as small as possible the rate of change of slope of the actual trajectory and correspondingly the downward acceleration of the pantograph head and thus moderate the increase in contact force between the wire and pantograph head.

This aim is achieved by supporting the wire at each support position through spring means which is stiff for an upward force below a predetermined value acting on it through the wire and which is relatively soft for an upward force above a predetermined value acting on it through the wire.

Referring now to FIG. 3, this shows one practical embodiment of the invention. Member 10 is cantilevered to the mast 11 through insulator 12 and is a fairly stiff or rigid member. Anchored to the member 10 is a leaf spring 13 which at its outer end extends beyond the outer end of member 10. The unloaded position of spring 13 is shown in dotted line.

From the outer end of spring 13 is suspended the contact wire 1 which thus tends to be lifted by the spring 13. The weight of the wire 1 and the tension in the wire cause the spring 13 to come up against the abutment 14 at the outer end of member 10 with considerable downward force and the combination of member 10 and spring 13 provide a relatively rigid support for the wire i.e., a support with a very stiff spring rate. The strength of spring 13 is so selected that normal upward pantograph pressure does not counteract the downward force exerted by the wire sufficiently for the spring 13 to lift off its abutment 14. When, however, a pantograph is in the neighborhood of the support and it exerts a contact pressure greater than the normal pressure, the resultant downward force exerted by the wire over the upward pantograph force is sufficiently reduced for spring 13 to leave its abutment 14 and the wire 1 will then lift in response to increases in force exerted by the pantograph by an amount corresponding with the greater flexibility i.e., the softer spring rate thus provided by the increase in the effective length of the spring 13.

The effect of supports constructed in this manner on the contact point trajectory of the pantograph head is illustrated by the dotted line 15 in FIG. 4, the undisturbed profile of the wire 1 being shown by line 16. As the pantograph is approaching a support point 2 the pressure it exerts on the wire is at first slightly less than the average force. The support therefore behaves as a relatively rigid support. When the contact point enters the region where the curvature of the wire is downwards, the inertia of the pantograph head causes it to press against the wire with increased force and spring 13 lifts from the abutment, allowing the point of support and the wire to lift considerably for a small increase in force. The trajectory is thereby caused to be of reduced curvature.

When the soft spring 13 has left its abutment 14 the vertical component of the further motion of the pantograph head is approximately as though its equivalent mass $M$ was moving against the elastic resistance of spring 13 of stiffness $K_2$. This motion is sinusoidal of frequency $$\frac{1}{2\pi}\sqrt{\frac{K_2}{M}}$$

and by making $K_2$ small the period may be weight $10/K$ lengthened. For example, if $M$ were the mass of 10 lb. weight, i.l., $10/g$ and $K_2=120$ the frequency is 3.1 cycles per second. During a half-period a pantograph moving at 100 miles/hr. would travel about 21 ft. This means that the trajectory is such that the curvature is spread over about 21 ft. and the acceleration and the excess force is correspondingly small.

If, instead of the two-rate spring arrangement provided by the spring 13 and its support member 10, the line were supported on simple springs of the same large elasticity $K_2$ the desired result would not be achieved, because the point of support would lift considerably as the pantograph approached a support. The displacement for a spring of $K=120$ by a pantograph force of 20 lb. is 2 inches. The initial upward velocity would be increased and the beneficial effect largely lost. The corresponding accelerations of the wire would also produce undesirable whipping of the line. All these undesirable results are avoided by spring suspensions responsive only to the excess above normal forces.

The support at a mast may be divided between two springs, each being a two-rate spring arrangement corresponding to the two-rate spring arrangement shown in FIG. 3. Such a support arrangement is shown in FIG. 5. The spring further ahead in the direction of travel may with advantage be softer. The first spring may then be considered to reduce the upward slope of the trajectory before the second spring is reached and the second spring operates as already described in response to this improved situation.

Damping might also be introduced into the system at the masts where springs are used.

Thus, by the invention, the changes in slope of the trajectory at supports can be greatly reduced by the appropriate combination of wire size and tension and the variation of contact force due to such changes of slope as remain may be made much smaller by the use of two-rate support spring arrangements as described.

We claim:

1. A trolley wire overhead electric supply system for supplying power for the propulsion of electric vehicles, comprising a plurality of supporting masts spaced from one another, a contact wire in tension spanning adjacent ones of said masts, connecting means rigid with each mast, spring means at each mast, each of said spring means having one end thereof connected to its associated mast through said connecting means and having the other end thereof connected directly to said contact wire whereby said contact wire is resiliently supported through said spring means and said connecting means directly on said mast, and abutment means connected directly to each mast through said connecting means, said spring means engaging said abutment means under the weight of said contact wire whereby, for an upward force below a predetermined value acting on each spring means through said contact wire, the spring means remains in engagement with its associated abutment means to cause the contact wire to be relatively stiffly connected to each mast and, for an upward force above said predetermined value acting on each spring means through said contact wire, the spring means is free of engagement with its associated abutment means to cause the contact wire to be relatively softly connected to each mast.

2. An overhead electric supply system as claimed in claim 1 wherein each of said spring means comprises a leaf spring anchored at one end to said connecting means and supporting the contact wire at its other end, said abutment means being so positioned that the leaf spring abuts nearer its said other end under the downward loading imposed on it by the contact wire, the leaf spring in its unloaded position being out of contact with said abutment means.

3. An overhead electric supply system as claimed in claim 2 wherein at each mast said contact wire is supported by a pair of said spring means spaced from each other on either side of a support position.

* * * * *